Feb. 21, 1967     A. G. P. BIET     3,305,316
CYCLIC PROCESS FOR THE RECOVERY OF BROMINE
FROM MIXTURES OF HYDROBROMIC AND
SULFURIC ACIDS
Filed Jan. 8, 1964
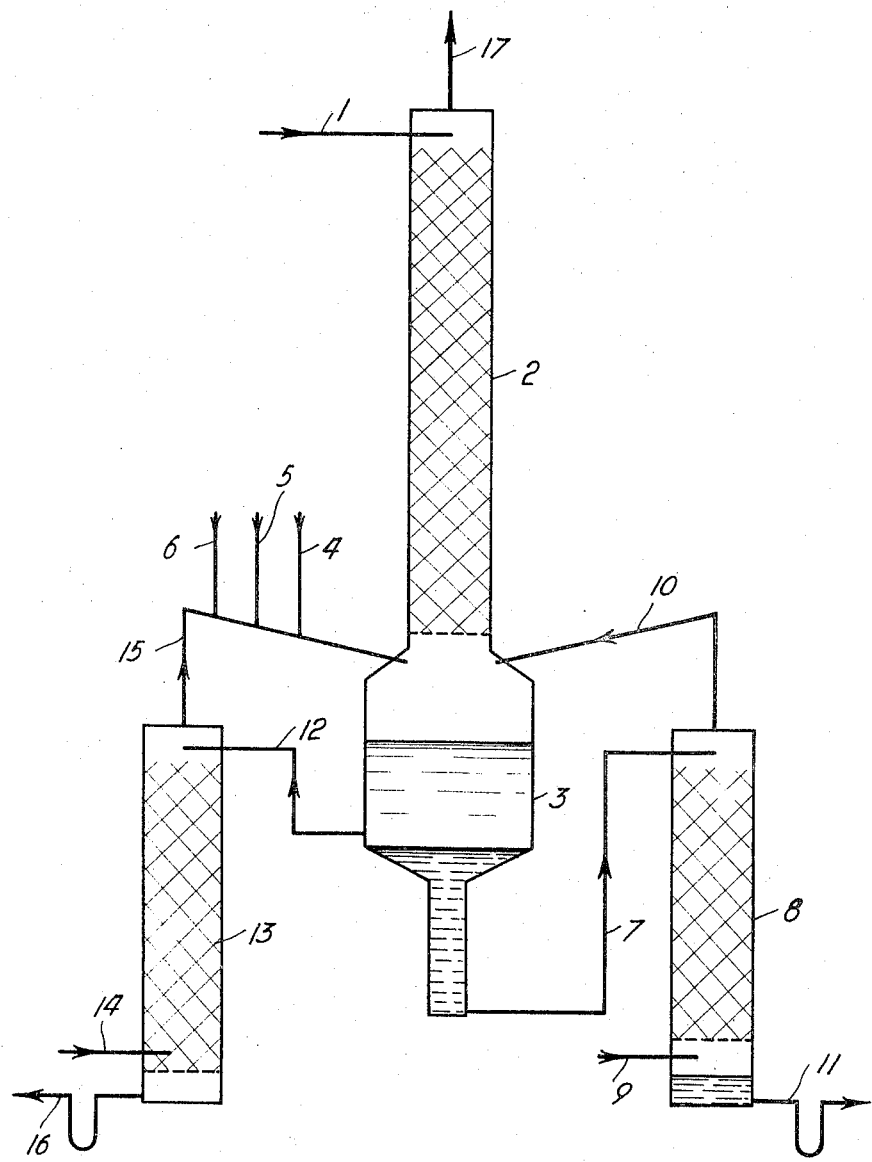
INVENTOR
ALFRED G. P. BIET
BY
Hammond and Littell
ATTORNEYS 3,305,316
CYCLIC PROCESS FOR THE RECOVERY OF BROMINE FROM MIXTURES OF HYDROBROMIC AND SULFURIC ACIDS
Alfred G. P. Biet, Port-de-Bouc, France, assignor to Societe Anonyme: Etablissements Kuhlmann, Paris, Seine, France, a French corporation
Filed Jan. 8, 1964, Ser. No. 336,517
Claims priority, application France, Jan. 9, 1963, 920,916
8 Claims. (Cl. 23—216)

The present invention has for its object a method for preparing bromine from hydrobromic acid or from liquid or gaseous mixtures containing such acid, and is more particularly adapted to the extraction of bromine from sea water. The invention also relates to an apparatus for carrying such process into effect.

As known, bromine is presently extracted from sea water by a two-step process, as stated briefly hereinafter:

*First step.*—Sea water, containing as from 65 to 70 grams of bromine per cubic meter, is acidified with an acid, preferably sulfuric acid, up to a pH value close to 3.5, which requires from 150 to 160 grams of $H_2SO_4$ per cubic meter sea water; the bromine is then displaced by means of chlorine and carried along by an air stream. The brominated air containing generally less than 1 g. of bromine per cubic meter is then mixed with sulfur dioxide in the presence of spray water, the reaction produced being in accordance with the following Equation 1:

$$Br_2 + SO_2 + 2H_2O \rightarrow 2HBr + H_2SO_4 \qquad (1)$$

The reaction mixture, consisting of hydrobromic acid and sulfuric acid, will be hereinafter referred to in the specification as "bromosulfuric acid"; upon condensation, the mixture will yield a solution containing from 50 to 140 g. HBr per liter, according to the extent of the water spraying.

At the end of the first step, a concentration of bromine is obtained which is about 700 to 2000 times as strong as that of sea water, with a yield of from 80 to 95% with respect to the bromine initially contained in the sea water.

*Second step.*—The bromosulfuric acid obtained in the previous step is then treated with chlorine in stoichiometrical proportions; the bromine thus displaced is carried away in the hot, by means of steam, and thereafter condensed and separated. Subsequently, use is made of the residual acid obtained to acidify the sea water.

The present invention has for its main object a method for the recovery of bromine from bromosulfuric acid, without the use of chlorine, and comprising treating the hydrobromic acid exclusively by nitric oxidation in a sufficiently acid medium, the used nitric acid being completely and permanently regenerated, the general reaction—the inherent losses not being accounted for—being in accordance with the following Equation 2:

$$4HBr + O_2 \rightarrow 2Br_2 + 2H_2O \qquad (2)$$

It has already been proposed to treat a bromosulfuric mixture, the sulfuric acid contents of which is lower than 20%, by nitric oxidation in the vicinity of 100° C., thereby obtaining bromine vapours which are isolated and condensed. This known process utilizes, for the oxidation step of the hydrobromic acid, a high excess of nitric acid— more than three times the theoretical quantity required— and, under the most favourable conditions, the oxidation yield is of the order of 90%. In order to achieve a total conversion—i.e. with a 100% yield—of the $Br^-$ ion to free bromine, it is necessary, when resorting to this process, to provide for a supplemental addition of chlorine. It has further also been proposed to recover, in a manner known per se nitric oxidation products (and practically NOBr) in a highly complex and cumbersome equipment, distinct from the one employed for achieving the direct oxidation reaction for the recovery of bromine.

In the drawings, the figure shows a diagrammatic view of the apparatus utilized to practice the invention.

It is a primary object of the invention to provide a method for the complete oxidation of the bromosulfuric acid by the use of nitric compounds, without chlorine addition, in a comparatively simple, continuously operating equipment, from which pure bromine, in the liquid state, is directly withdrawn, with a quantitative yield.

The term "nitric process" as used herein refers either to the action of nitric acid, or of any nitric compounds capable of oxidizing hydrobromic acid, or also of such nitrous compounds as result from the said oxidation and again capable of oxidizing hydrobromic acid after reconversion to the nitric state.

The term "nitric mixture" as used in the present specification refers to nitric acid and to any of the nitric and nitrous compounds as hereabove defined.

According to the present invention, the method of recovering liquid bromine from a bromosulfuric acid solution consists essentially in bringing the soltuion in contact with a nitric medium and raise its acid value to more than 5 N through addition of a make-up mineral acid, maintaining said solution at a temperature ranging from room temperature to the boiling temperature of bromine under the pressure of operation, which corresponds advantageously to atmospheric pressure, thereby quantitatively producing $Br_2$ and NOBr. The temperature being maintained as above mentioned, between room temperature and that of the boiling point of bromine, the major portion of the bromine produced by the reaction separates, carrying along a small amount of NOBr dissolved therein, while the major amount of NOBr is released in the gaseous state, carrying along a small amount of bromine, another small amount of bromine remaining in solution and sometimes even in suspension in the residual acid, the contents of the components in each one of the said mixtures depending upon the temperature and the flow in the reactor.

The crude bromine settled by decantation is purified prior to its outlet from the reaction apparatus by carrying away the NOBr by means of a gas which is inert with respect to bromine, and the NOBr thus carried away, together with that directly released from the reactor, is brought in contact with oxygen or air at room temperature in the presence of a fresh amount of bromosulfuric acid solution to be treated, thereby regenerating nitric acid to react with said new amount of solution, after the addition of make-up mineral acid.

The various operating conditions for the method according to the invention will now be more fully described hereinafter, together with certain theoretical considera- itons which have been newly applied in the said method, specifically as relates to certain fundamental reactions concerning the nitric oxidation of the bromosulfuric mixture, and the recovery of the nitric compounds in the operation of the method of the invention.

(1) As is known, in an aqueous medium the equilibrium:

$$4H^+ + 3Br^- + NO_3^- \rightleftharpoons Br_2 + NOBr + 2H_2O \qquad (3)$$

establishes the more rapidly from left to right (oxidation of hydrobromic acid) as the reaction medium is more acid and hotter.

It is therefore most advantageous to operate the nitric oxidation on as concentrated a bromosulfuric acid as possible. To achieve this, the water spraying during the first step should be limited, or even reaction (1) and the condensation of the bromosulfuric acid should be carried out exclusively with the aid of the humidity in the water-saturated air which has carried along the bromine contained in the sea water. It is thus possible to obtain, in the first step, a bromosulfuric acid containing 150–250 g. HBr per liter, i.e. having a bromine concentration which is 2000 to 4000 times higher than that of the sea water.

It should be noted that a nitric acid of any titre may be used for the oxidation reaction, since it performs only as an oxygen transfer agent. For example, use may be made of the 50–70% nitric acid as normally obtained in conventional equipments.

According to an essential feature of the invention, a given amount of a mineral acid, or so-called make-up acid is added to the mixture of bromosulfuric acid to be treated and nitric acid.

As make-up acid, use may be made of sulfuric acid, which is perfectly suitable and which may be added in an amount such that the solution subjected to nitric oxidation has a $H_2SO_4$ contents higher than 20%.

The make-up sulfuric acid may be replaced, at least partially, by hydrochloric acid. In such a case, hydrochloric acid is added in such an amount that the mixture with the bromosulfuric acid has an acidity value $$(H_2SO_4 + HCl)$$

higher than 5 N.

In the case a weak bromosulfuric acid (70 to 100 g. of HBr per liter for instance) is to be treated, or when a make-up sulfuric acid of low concentration is used, or when hydrochloric acid is used instead of sulfuric acid, the temperature of the mixture may not be sufficiently high to cause a high enough reaction speed; it then becomes necessary either to heat the reactor, or to heat part of the bromosulfuric acid in a heat exchanger equipment before feeding the same to the reactor. On the contrary, when concentrated bromosulfuric acid and make-up sulfuric acid are used, the dilution heat of the concentrated sulfuric acid may cause the temperature of the reaction mixture to be raised to 58° C. and thereby cause the boiling of the bromine. In order to avoid this temperature increase, it is necessary either to cool down the bromosulfuric acid to a temperature sufficiently below room temperature before it is fed to the operating equipment, or to insert cooling means between the reactor and the contact column above the reactor to cool down the bromosulfuric and nitric acid mixture flowing back from said column into the reactor.

The above described operational alternatives comprising, according to the case, the supply or feeding of the reactor at a temperature equal to, higher, or lower than room temperature, shows the versatility of the method of the invention which enables bromosulfuric, nitric and make-up sulfuric acids to be used, with medium, low or high concentrations as desired.

(2) The major portion of the bromine released in reaction (3) settles immediately by decantation carrying along in solution part of the NOBr compound produced in said reaction. As soon as the crude bromine is drawn off, it may be freed from the nitrosyl bromide dissolved therein, by bubbling of an inert gas or air therethrough, by passing in a ring packed column with a counter-current of air, or by any other suitable means. The nitrosyl bromide NOBr thus released is returned into the apparatus, for instance by means of the stream of air or inert gas used for extracting the crude bromine.

The regeneration of the bromine contained in the nitrosyl bromide is operated in a very simple and rapid manner, when working in accordance with the invention. In the presence of bromosulfuric acid containing, for instance 50 to 250 g. of hydrobromic acid per liter, at room temperature and without any addition of a supplemental amount of sulfuric or hydrochloric acid, nitrosyl bromide will indeed react with oxygen (which may be pure oxygen or oxygen contained in air) and the water from the bromosulfuric acid according to the following Equation 4:

$$2NOBr + 2H_2O + O_2 \rightarrow 2HNO_3 + 2HBr \qquad (4)$$

HBr and $HNO_3$, after regeneration, will readily dissolve in the bromosulfuric acid used and will thereafter react according to the direct reaction (3), after adding the required amount of make-up acid.

(3) Due to the fact that the solubility of bromine in mixtures rich in $H_2SO_4$ is low and that the dissolved bromine may be readily carried along by steam, whereas the solubility of bromine in bromosulfuric acid which has not been enriched with $H_2SO_4$ is quite substantial, bromine losses resulting from said bromine being carried away by the air or inert gases used in the process are avoided.

Finally Equations 3 and 4 show that the oxidation of HBr by oxygen is effected according to the above mentioned Equation 2. The nitric acid, or the intermediate nitric compounds, thus function only as oxygen-transfer catalysts.

The invention is illustrated hereinafter by means of a non-limitative example of an embodiment thereof, with reference to the appended drawing which shows a diagram of a continuously operating apparatus for the extraction of bromine according to the invention.

Initially, bromosulfuric acid containing, preferably, 200 g. HBr per liter, is fed through a line 1 and passes through a packed column 2 and enters a reactor 3 which is also supplied with nitric acid through a line 4 with a make-up sulphuric acid and/or possibly, hydrochloric acid through a line 5, and with oxygen or air through line 6.

The flow of sulfuric acid is adjusted so that the temperature of the reaction mixture raises to a temperature between 40 and 58° C.; the mixture obtained in the reactor will then contain from 20 to 36% $H_2SO_4$, or, in the case the make-up acid is hydrochloric acid, the mixture will show an acidity $(H_2SO_4 + HCl)$ of at least 5 N.

The reaction according to Equation 3 then rapidly develops in reactor 3 and the major amount of the bromine obtained flows through a line 7 into a bubbling device or a packed column 8 maintained at a temperature close to room temperature. A counterflow of air or oxygen arriving through a line 9 carries away the nitrosyl bromide NOBr dissolved in the bromine and returns the same through line 10 at the bottom of column 2. The resulting bromine flows through a line 11 to storage means or to further treatment apparatus.

The residual acid, still containing bromine dissolved or in suspension, flows through a line 12 from the reactor 3 into a packed column or tower 13 into which steam and, possibly, a stream of air or inert gas is fed through a line 14 and which carries away the bromine which returns through a line 15 at the bottom of column 2. The bromine-free residual acid flows out through a line 16 and is used for acidifying further quantities of sea water to produce bromosulfuric acid.

The nitrosyl bromide (NOBr) produced by the reaction in reactor 3 and that returned through line 10, as well as the air or oxygen introduced into the apparatus as above mentioned, ascends in column 2 where they are brought in contact, in counterflow, with the cooled bromosulfuric acid admitted through line 1 and which has not been enriched with $H_2SO_4$. A reaction according to the above Equation 3 then takes place: the recovered HBr and $HNO_3$ dissolved immediately in the bromosulfuric acid supplied, before the latter drops into reactor 3 wherein a reaction according to the above Equation 2 is effected, after addition of sulfuric acid admitted through line 5.

Similarly, any free bromine carried away from column 8 by the air bubbling, as well as the bromine arriving through line 15 from the residual acid dissolves immediately in the bromosulfuric acid flowing from column 2 and is instantly returned into the reactor 3.

The excess air or oxygen, as well as the inert gases escape into the atmosphere through vent 17.

When the apparatus is under normal working conditions, the regeneration of the amount of HNO₃ required for reaction (2) is operated in column 2.

The equipment thus being loaded with HNO₃ of the amount required for normal operation, the supply of nitric acid may be either cut off or reduced to a rate such as to compensate for the very small losses resulting from occasional degradation of HNO₃ to nitrated products N₂O or N₂, or from being carried away in the residual acid.

Since the reactor operates at atmospheric pressure and at a temperature lower than that of the boiling point of bromine, the major portion of the bromine is obtained directly in the liquid state, without any vaporizing having been required. A substantial saving of steam is thus achieved with respect to the above described prior process, wherein the total amount of bromine had to be vaporized and carried along by steam. Besides, the regeneration of the nitric acid is effected in a particularly simple manner in the column located on top of the reactor, thus enabling the overall dimensions and the erection costs to be substantially reduced.

Modifications and variations may obviously be carried out in the method of the invention and in the corresponding equipment without departing from the scope and spirit thereof.

It is thus possible, for convenience and for maintenance reasons, to separate the main portion of the apparatus into independent individual elements: column 2, reactor 3, settling portion of said reactor, separators etc., and connect them in any suitable manner.

It is also possible to have the supply lines 4 for nitric acid, 5 for sulfuric acid, 6 for air or oxygen, and the return lines 10 for NOBr and 15 for bromine vapours open at the same point, at different points or in one or more headers located on top the reactor, at the bottom of column 2 or even in the lower part of the packing thereof.

The reactor 3 may also be fed directly with bromosulfuric, nitric and sulfuric acids, or a mixing plate, a small mixing vat or any other auxiliary device may be inserted between the bottom of column 2 and the surface of the liquid in reactor 3.

The suitable devices for the control and supply of the equipment such as pumps, proportioning pumps, flowmeters, etc., as well as the materials used for the manufacture of the various parts, such as, for instance, stainless steel, glass coated metal, Pyrex glass, silica, porcelain, plastic materials, etc. are within reach of anyone skilled in the art and need not be further described herein.

What I claim is:

1. A cyclic method for the direct recovery of liquid bromine from a mixed aqueous hydrobromic acid and sulfuric acid solution comprising the steps of contacting said solution with a nitric medium selected from the group consisting of nitric acid and nitrogen oxides capable of oxidizing hydrobromic acid, adding to the mixed aqueous hydrobromic acid, sulfuric acid and nitric acid solution a make-up amount of a mineral acid selected from the group consisting of sulfuric acid and hydrochloric acid to raise the acidity value thereof to at least 5 N, maintaining the temperature of the resulting mixture between about room temperature and the boiling point of bromine at the operation pressure, whereby liquid bromine and gaseous nitrosyl bromide are quantitatively obtained, separating said gaseous nitrosyl bromide from the reaction medium, separating liquid bromine containing a minor amount of nitrosyl bromide dissolved therein from the aqueous acidic solution still containing a minor amount of dissolved bromine by decanting, removing the dissolved nitrosyl bromide from said liquid bromine by passing a gas which is inert with respect to bromine through the mixture, recovering liquid bromine substantially free from nitrosyl bromide, heating said aqueous acidic solution containing a minor amount of bromine whereby said bromine is removed in the form of vapor, recycling said vaporous bromine to said mixed aqueous hydrobromic acid, sulfuric acid and nitric acid solution, and recycling said gaseous nitrosyl bromide and said nitrosyl bromide removed by said inert gas together with oxygen to said mixed aqueous hydrobromic acid and sulfuric acid solution whereby nitric acid is regenerated.

2. The method of claim 1 wherein said oxygen is contained in air.

3. The method of claim 1 wherein said mixed aqueous hydrobromic acid and sulfuric acid solution contains from 50 gm. to 250 gm. of hydrobromic acid per liter.

4. The method of claim 1 wherein said mixed aqueous hydrobromic acid and sulfuric acid solution contains from 150 gm. to 250 gm. of hydrobromic acid per liter.

5. The method of claim 1 wherein said mineral acid make-up is sulfuric acid and the sulfuric acid content of said resulting mixture is over 20%.

6. The method of claim 1 wherein said mineral acid make-up is sulfuric acid and the sulfuric acid content of said resulting mixture is between 20% and 36%.

7. The method of claim 1 wherein said mineral acid make-up is partly hydrochloric acid and the acidity value of the resulting mixture is higher than 5 N.

8. The method of claim 1 wherein said temperature of said resulting mixture is maintained between 40° C. and 58° C. at atmospheric pressure.

References Cited by the Examiner
UNITED STATES PATENTS 2,371,886   3/1945   Grebe et al. _____ 23—217

OTHER REFERENCES

J. W. Mellor's "A Comprehensive Treatise on Inorganic and Theoretical Chemistry," volume 8, 1928 edition, pages 382–383, Longmans, Green and Company, N.Y.

OSCAR R. VERTIZ, *Primary Examiner.*

EDWARD STERN, *Examiner.*